United States Patent [19]

Arai

[11] Patent Number: 5,012,069
[45] Date of Patent: Apr. 30, 1991

[54] POWER CONTROL METHOD IN A CNC LASER MACHINING SYSTEM

[75] Inventor: Takeji Arai, Minamitsuru, Japan
[73] Assignee: Fanuc Ltd., Minamitsuru, Japan
[21] Appl. No.: 415,233
[22] PCT Filed: Jan. 18, 1989
[86] PCT No.: PCT/JP89/00041
  § 371 Date: Sep. 6, 1989
  § 102(e) Date: Sep. 6, 1989
[87] PCT Pub. No.: WO89/07035
  PCT Pub. Date: Aug. 10, 1989

[30] Foreign Application Priority Data

Jan. 29, 1988 [JP] Japan ................. 63-018603

[51] Int. Cl.⁵ .............................. B23K 26/00
[52] U.S. Cl. ................ 219/121.62; 364/474.08
[58] Field of Search ......... 219/121.o, 121.61, 121.62, 219/121.85, 121.67, 121.68, 121.69, 121.72; 364/474.08

[56] References Cited

U.S. PATENT DOCUMENTS 4,638,145 1/1987 Sakuma et al. ............... 219/121.78
4,758,705 7/1988 Hertzel et al. ............ 219/121.61 X
4,937,422 6/1990 Nagamine et al. ............ 219/121.61

Primary Examiner—C. L. Albritton
Attorney, Agent, or Firm—Staas & Halsey

[57] ABSTRACT

A power control method in a CNC (computerized numerical control) laser machining system including a CNC apparatus and a laser machining apparatus. The CNC apparatus (10) lowers a laser output by reducing both a pulse duty ratio and a pulse frequency in accordance with the lowering of a machining velocity when machining a corner portion. According to this method, a machining accuracy in the corner portion is improved, thermally influenced regions on the workpiece are reduced, and a surface roughness of the machined engraved surface is improved.

9 Claims, 6 Drawing Sheets

POWER CONTROL METHOD IN A CNC LASER MACHINING SYSTEM

TECHNICAL FIELD

The present invention relates to a power control method in a CNC (computerized numerical control) laser machining system, and more particularly to such a method in which an improvement is made in the machining of a corner portion.

BACKGROUND ART

Laser machining apparatuses are extensively used in conjuction with a numerical control apparatus, because a workpiece can be machined thereby to form a complex shape at a high speed. In a conventional laser machining apparatus, a direction in which a laser beam is moved must be reversed while temporarily making a speed of the laser beam relative to the workpiece zero when the workpiece is machined to form a corner portion or an acute angle edge portion. That is, when machining the corner portion, the moving speed of the laser beam is decelerated, stopped, and then accelerated.

FIG. 5 illustrates a workpiece 40 machined by the laser beam to form a groove 41. To form the groove as illustrated, the laser beam is moved relative to the workpiece 40 in the direction indicated by an arrow A. Before reaching a corner portion 42, the speed at which the laser beam is moved is decelerated, the beam is temporarily stopped at the corner portion 42, and the beam is then accelerated after passing the corner portion 42. In this manner, the speed of the laser beam relative to the workpiece 40 is reduced when the laser beam passes through the corner portion 42. Therefore, a defective melting occurs in the corner portion due to a storage of thermal energy and excessive heat absorption when the machining is performed under not only a CW beam condition but also a pulsed beam condition. Thus the cutting accuracy and the quality of the final product are greatly reduced.

FIG. 6 is an enlargement of the corner portion shown in FIG. 5, in which the corner portion of the groove machined by the laser beam is illustrated in detail. Portions B and C indicated by oblique lines alongside of the corner portion are melted down due to the lowering of the relative speed of the laser beam, whereby the machining accuracy is lowered. Further, the thermally influenced regions are extended to portions D and E, to thereby exert adverse influence upon the material of the workpiece and increase the surface roughness of the engraved surface.

As a solution, the machining of the corner portion can be controlled in such a manner that a pulse duty ratio is lowered in accordance with to the lowering of the speed at which the laser beam is moved, to thereby reduce the laser output. This method is not satisfactory, however, in that a dross-free machining cannot be accomplished over an extensive region.

SUMMARY OF THE INVENTION

The present invention has been created in view of the foregoing circumstances, and an object of the invention is to provide a power control method in a CNC laser machining system in which an improvement is made in the machining of a corner portion.

To achieve the above and other objects, there is provided a power control method in a CNC laser machining system including a CNC apparatus and a laser machining apparatus for machining a workpiece, the method comprising the step of: lowering an output power of a laser beam by reducing both a pulse duty ratio and a pulse frequency when the machining velocity is lowered.

As will be described later, when machining a corner portion, the regions in which an excessive melting loss does not occur are limited, even if the pulse duty ratio is reduced in accordance with to the lowering of the machining velocity. Experimental results have proved that such regions are enlarged if the pulse frequency is varied. Therefore, according to the method of the present invention, not only the pulse duty ratio but also the pulse frequency is reduced in accordance with to the lowering of the machining velocity, whereby desirable machining results can be obtained over the entire region along which the machining velocity is varied.

DESCRIPTION OF THE PREFERRED EMBODIMENT

Figure 1:
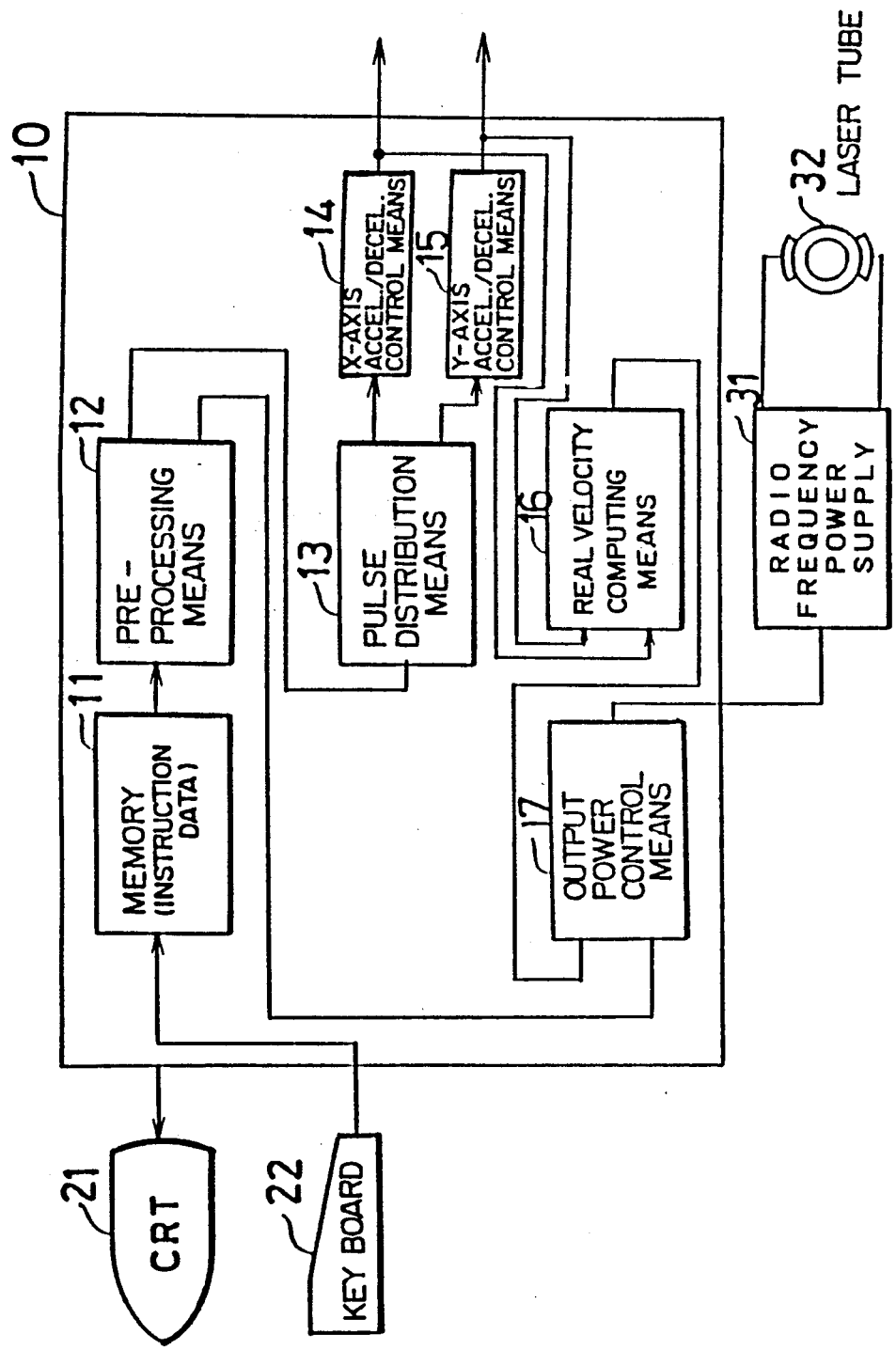
FIG. 1 is a block diagram showing a CNC laser machining apparatus used in the present invention.

A preferred embodiment of the present invention will now be described with reference to the accompanying drawings. FIG. 1 is a block diagram showing a CNC (computerized numerical control) laser machining apparatus as used in the present invention. In the figure, a CNC apparatus is generally designated by reference numeral 10, which controls the laser machining apparatus. A memory 11 is provided in the CNC apparatus for storing instruction data therein. A pre-processing means 12 separated the instruction data into two kinds of data and translates the latter into executable data. More specifically, the instruction data is separated into position/velocity control data for controlling the movement of an X-Y table on which a workpiece is fixedly mounted, and an output power control signal for controlling the output power of a laser beam.

The position/velocity control data is fed to a pulse distribution means 13. The pulse distribution means 13 supplies pulses to both the X-axis and Y-axis control means 14 and 15 with X-axis and Y-axis distribution pulses, respectively, which are produced from the position/control data. In the X-axis and Y-axis control means 14 and 15, the distribution pulses are subjected to acceleration/deceleration processings to provide X-axis and Y-axis drive signals. Each of such drive signals is supplied to the associated servo motor drive circuit (not shown) for driving a servo motor coupled thereto, whereby the movement of the X-Y table is controlled.

The X-axis and Y-axis drive signals subjected to acceleration/deceleration processing are fed to a real velocity computing means 16, and the computing means 16 computes a real velocity of the X-Y table based upon the X-axis and Y-axis drive signals fed thereto. The real velocity can be obtained by composing vectors indicating the X-axis and Y-axis velocities. The resultant velocity corresponds in substance to the velocities of the servo motors or is substantially equal to a speed of the X-Y table relative to a laser head. Where a more accurate velocity is needed, this can be obtained from a velocity feedback device provided in association with the servo motor, for example, a pulse coder.

The output power control signal fed from the preprocessing means 12 is supplied to the output power control means 17 which, in response thereto, controls the output of the laser beam. In a normal machining procedure, the output power control means 17 delivers the output control signal input to a high frequency power supply 31. When the laser beam approaches a corner portion and the relative velocity of the laser beam is reduced, the control means 17 controls the high frequency power supply 31 so that the output power of the laser beam is reduced in accordance with the reduction of the velocity.

A display unit 21 is provided to display, for example, position, velocity, and machining data. A CRT (cathode ray tube), an LCD (liquid crystal display) or the like is used therefor. A keyboard 22 is provided for imputting the various kinds of data and parameters including the instruction data, to the laser machining apparatus.

The radio frequency power supply 31 supplies a radio frequency power, and due to the application of the radio frequency power thereto, radio frequency discharges occur in the laser tube 32 and a laser beam is thereby oscillated and amplified.

Next, a description will be given of the control of the output power.

Figure 2:
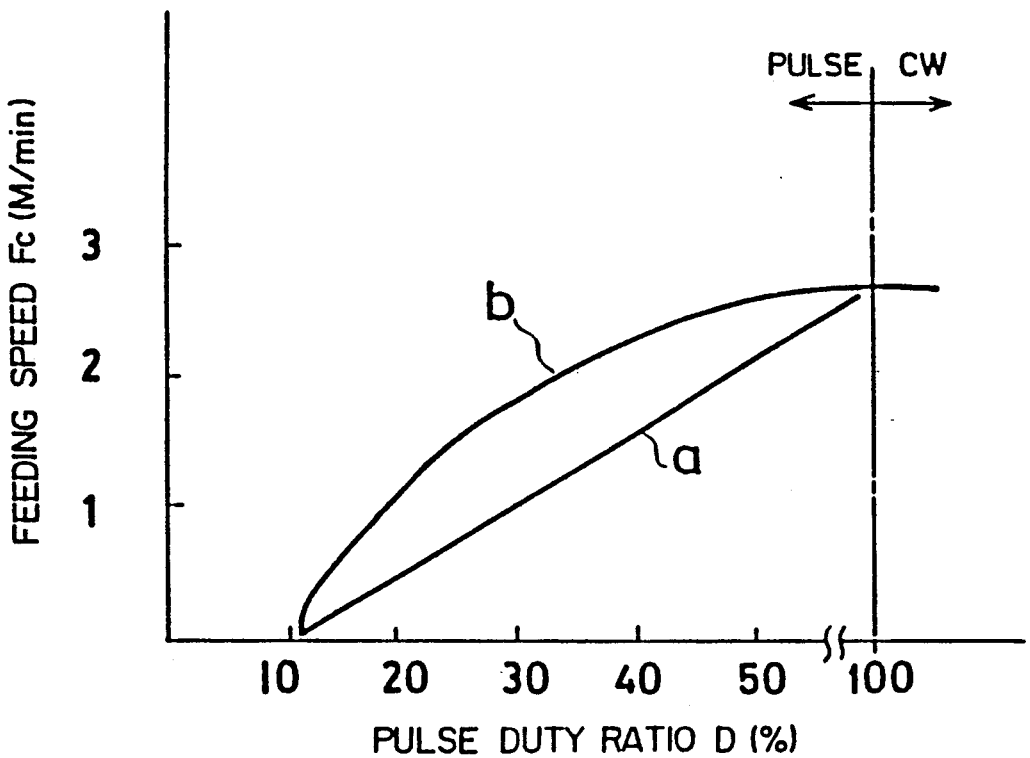
FIG. 2 is a graphical representation showing a relation between a pulse duty ratio and a speed of a laser beam relative to an X-Y table.

FIG. 2 is a graphical representation showing a relationship between a duty ratio and a velocity of the laser beam relative to the X-Y table. In FIG. 2, the axis of abscissa represents the duty ratio (%) and the axis of ordinate represents a feeding speed Fc (M/min) of the X-Y table. With respect to the feeding speed, the duty ratio may be changed either linearly as indicated by the line a or non-linearly as indicated by the curve b, and the selection thereof is determined in accordance with various conditions, such as the material of the workpiece, the thickness thereof, the machining velocity, and the machining accuracy as required.

By reducing the pulse duty ratio in accordance with the lowering of the feeding speed, the excessive melting loss at the corner portion can be effectively prevented which may otherwise be caused by the storage of the heat energy in the workpiece and excessive absorption of the heat thereinto, whereby a dross-free machining is attained.

However, as a result of experiments, it has been found that such desirable results are obtained only in a restricted region of the workpiece, and such the desirable results cannot be obtained over the entire region of the workpiece merely by changing the pulse duty ratio.

Figure 3:
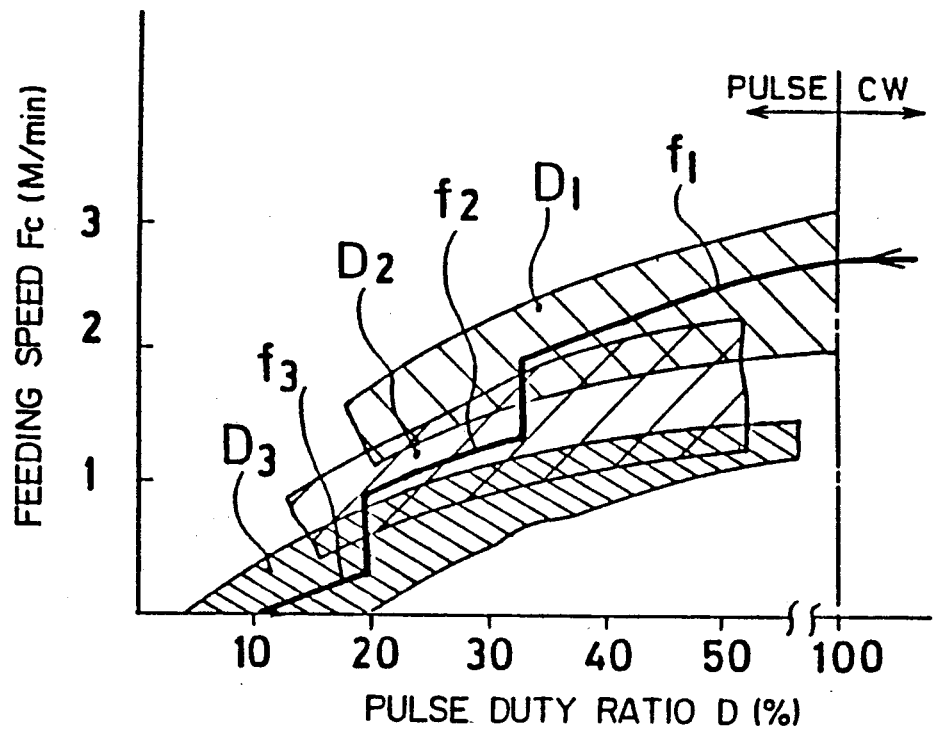
FIG. 3 is a graphical representation showing a relationship between a pulse duty ratio and a machining region, in which a pulse frequency is stepwise varied.

FIG. 3 is also a graphical representation in which desirable machining regions are indicated in relation to the curve of the pulse duty ratio vs. the feeding speed. In FIG. 3, the axis of abscissa represents the duty ratio (%) and the axis of ordinate represents a feeding speed (M/min). In the pulse machining performed under the pulse frequency of f1, good machining results are obtained only in the region D1 if the pulse duty ratio is reduced in accordance with the lowering of the feeding speed, and good machining results can not be obtained outside of the region D1. In the pulse machining performed under the pulse frequency of f2, good machining results or dross-free conditions are obtained in the region D2, and under the pulse frequency of f3, in the region D3.

From the foregoing it can be observed that, as the machining speed is lowered when machining the corner portion, the pulse frequency should be stepwise reduced from f1 to f2 and then f2 to f3 in accordance with the reduction of the pulse duty ratio.

Figure 4:
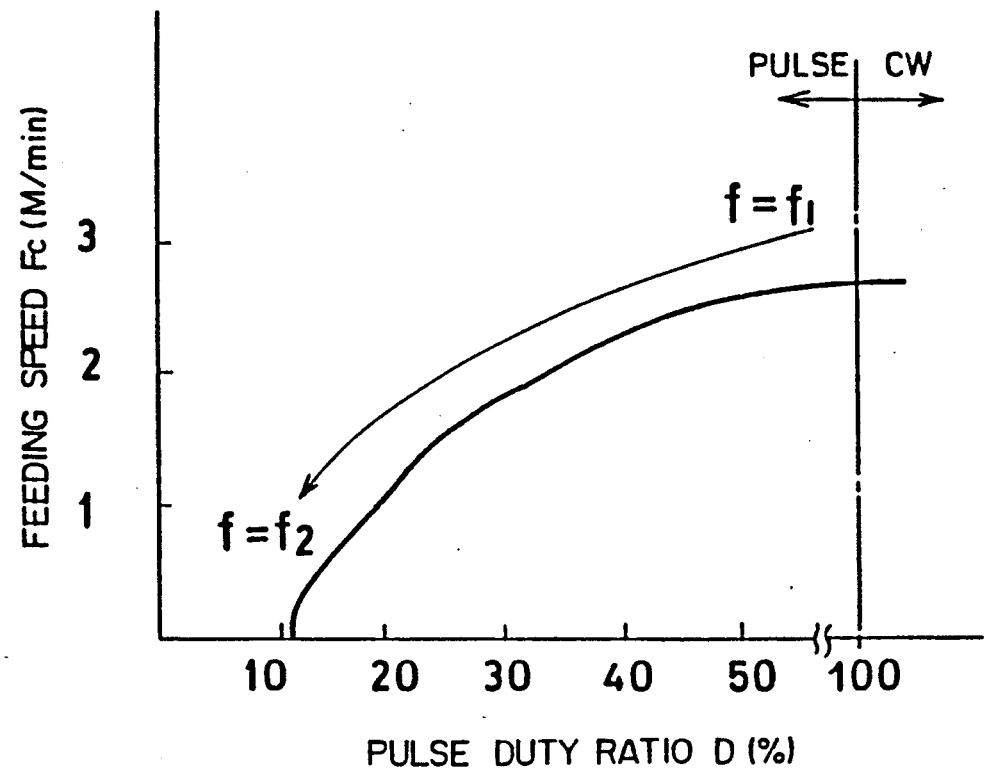
FIG. 4 is a graphical representation showing a relationship between a pulse duty ratio and a machining region, in which a pulse frequency is continuously varied.
Figure 5:
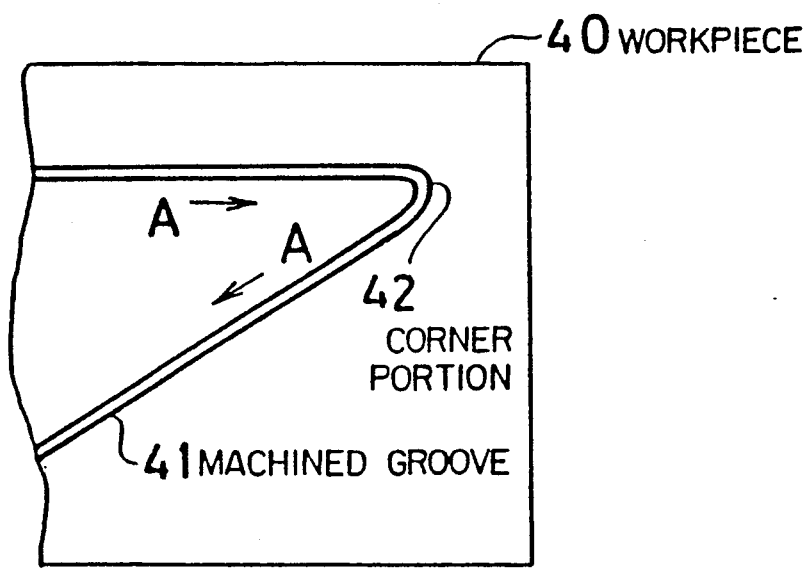
FIG. 5 is a diagram showing a workpiece machined to form a corner portion.
Figure 6:
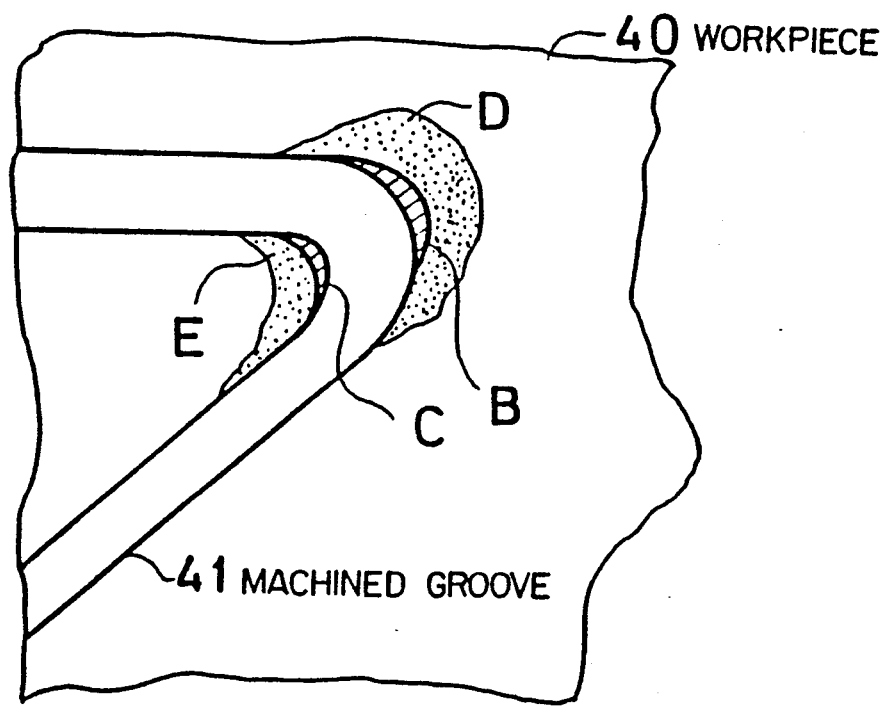
FIG. 6 is an enlarged diagram showing a machined groove in the corner portion in detail.

FIG. 4 is also a graphical representation which illustrates the case wherein the pulse frequency is continuously varied. In FIG. 4 the values of each axis are the same as in FIG. 3 respectively, but as illustrated therein, the pulse frequency may be changed continuously. The manner of continuously varying the pulse frequency is determined on an experimental basis, depending upon the material of the workpiece to be machined and the thickness thereof, etc.

Although the machining of the workpiece has been described with respect to the case wherein the machining velocity at the corner portion is lowered, the same results can be obtained when performing minute machining, such as when machining a minute slit in a small area, if both the pulse duty ratio and the pulse frequency are simultaneously lowered.

As described above, according to the present invention, since both the pulse duty ratio and the pulse frequency are reduced in accordance with the lowering of the velocity of the laser beam when machining the corner portion, various advantages are obtainable, such as an improvement of the machining accuracy, a reduction of the heat effected zone, and an improvement of the surface roughness of the machined engraved surface.

What is claimed is:

1. A power control method in a (computerized numerical control CNC) laser machining system including a CNC apparatus and a laser machining apparatus for machining a workpiece, said method comprising the step of:
   lowering a machining velocity, and at the same time, lowering an output power of a laser beam by reducing both a pulse duty ratio and a pulse frequency.

2. A method according to claim 1, wherein said step of lowering an output power comprises the substep of:
   linearly varying said pulse duty ratio.

3. A method according to claim 1, wherein said step of lowering an output power comprises the substep of:
   non linearly varying said pulse duty ratio.

4. A method according to claim 1, wherein said step of lowering an output power comprises the substep of:
   varying said pulse frequency in a stepwise manner in accordance with the lowering of said machining velocity.

5. A method according to claim 1, wherein said step of lowering an output power comprises the substep of:
   continuously varying said pulse frequency in accordance with the lowering of said machining velocity.

6. A method according to claim 1, wherein said step of lowering an output power comprises the substep of:

varying said output power within a range of 0 to 100%.

7. A method of according to claim 1, wherein said CNC apparatus includes servo motors and said method further comprising the step of:

computing said machining velocity from a velocity of the servo motors after the motors are accelerated or decelerated.

8. A method according to claim 1, wherein said CNC apparatus includes a velocity feed back means and said method further comprises the step of:

computing said machining velocity from a velocity feedback amount provided by the velocity feedback means.

9. A power control method in a computerized numerical control (CNC) laser machining system including a CNC apparatus and a laser machining apparatus for performing a minute machining of a workpiece with a laser beam having a power, said method comprising the step of:

lowering a machining velocity, and at the same time, lowering the power of said laser beam by reducing both a pulse duty ratio and a pulse frequency.

* * * * *